US011996628B2

(12) United States Patent
Mehmood et al.

(10) Patent No.: US 11,996,628 B2
(45) Date of Patent: May 28, 2024

(54) PHASED ARRAY ANTENNA DEVICE

(71) Applicant: BEIJING BOE SENSOR TECHNOLOGY CO., LTD., Beijing (CN)

(72) Inventors: Arshad Mehmood, Darmstadt (DE); Alexander Gäbler, Darmstadt (DE); Kashan Mobeen, Darmstadt (DE); Ahmet Kenan Keskin, Pendik/Istanbul (DE); Yordan Bozmarov, Tuntenhausen (DE)

(73) Assignee: BEIJING BOE SENSOR TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/814,053

(22) Filed: Jul. 21, 2022

(65) Prior Publication Data

US 2023/0028486 A1 Jan. 26, 2023

(30) Foreign Application Priority Data

Jul. 23, 2021 (EP) .................................... 21187561

(51) Int. Cl.
*H01Q 3/36* (2006.01)

(52) U.S. Cl.
CPC .................................... *H01Q 3/36* (2013.01)

(58) Field of Classification Search
CPC ........ H01Q 3/36; H01Q 3/44; H01Q 21/0075; H01Q 21/065
See application file for complete search history.

(56) References Cited

U.S. PATENT DOCUMENTS 5,878,327 A * 3/1999 Hayashi ............... H01Q 21/062 455/517
6,377,217 B1 * 4/2002 Zhu ......................... H01P 1/181 343/771

(Continued)

FOREIGN PATENT DOCUMENTS

EP 1212809 B1 3/2004

OTHER PUBLICATIONS

Arshad Mehmood et al., Co-pending U.S. Appl. No. 17/814,040.

*Primary Examiner* — Awat M Salih
(74) *Attorney, Agent, or Firm* — Dilworth & Barrese, LLP.; Michael J. Musella, Esq.

(57) ABSTRACT

A phased array antenna device comprises antenna elements positioned within a corresponding unit cell. The unit cells are arranged non-overlappingly next to each other. A feeding network transmits antenna signals between a common control unit and the respective antenna element. The feeding network comprises a plurality of antenna element transmission line segments, each running into an antenna element, and a plurality of phase shifting devices. Several feeding transmission line segments, each comprising more than two transition structures are provided. Each transition structure couples a signal into a corresponding antenna element transmission line segment. The transition structure for an antenna element transmission line segment that runs into a unit cell is positioned in the direction of the feeding transmission line segment passing by or traversing this unit cell at a phase shifting distance that is larger than an extension of the unit cell measured in this direction.

11 Claims, 8 Drawing Sheets

(56) References Cited

U.S. PATENT DOCUMENTS

| | | | | |
|---|---|---|---|---|
| 2002/0126048 | A1 | 9/2002 | Zhu et al. | |
| 2006/0055604 | A1* | 3/2006 | Koenig | H01Q 21/065 343/700 MS |
| 2007/0091008 | A1 | 4/2007 | Mortazawi et al. | |
| 2014/0253408 | A1 | 9/2014 | Kikin | |
| 2016/0233589 | A1 | 8/2016 | Kim et al. | |
| 2017/0005405 | A1* | 1/2017 | Kim | H01Q 13/206 |
| 2019/0115664 | A1* | 4/2019 | Veihl | H01Q 5/50 |
| 2022/0320731 | A1* | 10/2022 | Xi | G02F 1/13 |

* cited by examiner

PHASED ARRAY ANTENNA DEVICE

CROSS-REFERENCE TO RELATED APPLICATION

This application claims the benefit of European Patent Application No. 21 187 561.2, filed 23 Jul. 2021, the contents of which is hereby incorporated by reference in its entirety.

TECHNICAL FIELD

The disclosure relates to a phased array antenna device with a plurality of antenna elements arranged in a spatial distribution that is designed to allow for the phased array antenna device emitting and receiving superposing radio frequency signals to and from different directions.

BACKGROUND

A phased array antenna device operating with radio frequency signals allows for emitting a beam of radio frequency electromagnetic waves that can be electronically steered to point in different directions without moving the antenna device. Similarly, many phased array antenna devices also allow for amplifying the reception sensitivity for radio frequency waves from a certain direction without moving the antenna device.

In most phased array antenna devices, the radio frequency current from a transmitter is fed to the individual antenna elements with the correct phase relationship so that the radio frequency waves from the separate antenna elements superimpose and add together to increase the radiation intensity in a desired direction and cancel to suppress radiation intensity in undesired directions. In a phased array antenna device, the power from the transmitter is fed to the many antenna elements through devices called phase shifters which can alter the respective phase of the corresponding antenna signals electronically, thus steering the superimposed beam of radio frequency waves to a different direction. Usually, a phased array antenna device must consist of many small antenna elements, sometimes comprising more than thousand antenna elements that are arranged in a preset spatial distribution. For many phase array antenna devices, a large number of antenna elements is arranged in a plane in a matrix spatial distribution. Even though the distance between adjacent antenna elements can be preset to almost any value, a space-saving arrangement requires the distance to be approx. $\lambda/2$ with $\lambda$being the wavelength of the radio frequency signal that is to be emitted or received with the phased array antenna device.

For many phased array antenna devices each antenna element is arranged within a unit cell, whereby a unit cell defines a small region within a plane that is dedicated to the respective antenna element that is arranged within this plane. The plane can be segmented into a plurality of unit cells that each comprise one antenna element and usually also comprise a similar pattern of other electrodes or components, whereby the unit cells cover the plane in a non-overlapping but adjoining manner and usually in a matrix shaped arrangement. Usually a unit cell has no structural limitation, but can be seen as region around an antenna element with a repeating pattern of electrodes and other components. The extension of a unit cell in a given direction equals the distance of adjacent antenna elements in said direction. For each unit cell, the corresponding antenna element is connected to a control unit via a corresponding antenna element transmission line segment. In case of a large number of unit cells with antenna elements, the space requirements for a corresponding number of antenna element transmission line segments are become huge and significantly limit the usable space for antenna elements.

In order to reduce the total length of antenna element transmission line segments that are required for individual connections to each of the antenna elements, many phased array antenna devices comprise a corporate feed network starting with a small number of first corporate feed transmission line segments each branching into two separate second corporate feed transmission line segments. The branching can be repeated several times, resulting in a corporate feed network with cascading corporate feed transmission line segments until after N branching levels the total number of final corporate feed transmission line segments equals the required number of antenna element transmission line segments each running to the corresponding antenna element.

However, in order to allow for a cost-effective manufacture of such a cascading corporate feed network, all corporate feed transmission line segments are arranged on the same surface of a substrate layer. Any crossing of corporate feed transmission line segments or vertical change away from the surface should be avoided. Therefore, such a cascading corporate feed network imposes several limitations to the design of the phased array antenna device and to the arrangement of unit cells and corresponding antenna elements. Furthermore, the total length of the resulting corporate feed transmission line segments and the antenna element transmission line segment for a signal transmission between the control unit and the antenna element will be quite large if crossings or overlaps of corporate feed transmission line segments are avoided.

For many phased array antenna devices, a part or the full length of the antenna element transmission line segment is designed to be used as phase shifting element. For each antenna element there is a given phase shift of the radio frequency signal required for obtaining a peak intensity of the superimposed radio frequency signal of all antenna elements in a preset direction. Therefore, the antenna element transmission line segment is usually arranged within the corresponding unit cell of the antenna element for which the phase shift is preset by the respective antenna element transmission line segment that runs into the antenna element and that connects the antenna element with a common control unit.

It is possible to make use of a transmission line segment as phase shifting device by arranging a tunable dielectric material between electrodes of the transmission line element. However, the range of different permittivity values of a tunable dielectric material that can be controlled and modified by application of an electric field is limited, and thus the maximum phase shift that can be preset for a signal transmission along such a transmission line segment is limited as well. Therefore, for many applications the required minimum length of the transmission line segment that is used as phase shifting device exceeds the largest extension of a unit cell.

As the minimum length of the antenna element transmission line segment that is used as phase shifting device is longer than the extension of the unit cell, the antenna element transmission line segment usually has a spiral or meandering course with several curves and corners. However, each curve and in particular each corner of the antenna element transmission line segment causes unwanted electromagnetic radiation, resulting in a loss of signal quality and increasing the interference between adjacent unit cells.

SUMMARY

The present disclosure provides an effective and space-saving arrangement of signal transmitting connections between the control unit and each of the antenna elements of a phased array antenna device, whereby unwanted electromagnetic radiation along the antenna element transmission line segments is reduced.

The phased array antenna device includes a plurality of antenna elements arranged in a spatial distribution that is designed to allow for the phased array antenna device to emit and receive superposing radio frequency signals to and from different directions. Each antenna element is positioned within a corresponding unit cell of the phase array antenna device. The unit cells are arranged in a non-overlapping manner next to each other, with a feeding network for transmitting the antenna signals between a common control unit and the respective antenna element. The feeding network comprises a plurality of antenna element transmission line segments each running into an antenna element, and a plurality of phase shifting devices. For each antenna element a corresponding phase shifting device is arranged along the respective antenna element signal transmission line that runs into said antenna element.

The phased array antenna device comprises several feeding transmission line segments whereby each feeding transmission line segment comprises more than two transition structures distributed along the feeding transmission line segment. Each transition structure provides for a signal coupling into a corresponding antenna element transmission line segment, thereby connecting several dedicated antenna element transmission line segments with the same feeding transmission line segment. The transition structure for an antenna element transmission line segment that runs into a unit cell is positioned in the direction of the feeding transmission line segment passing by or traversing this unit cell at a phase shifting distance that is larger than an extension of the unit cell measured in this direction.

Contrary to a corporate feed transmission line segment that branches into two secondary corporate feed transmission line segments, the feeding transmission line segment does not branch into two secondary transmission line segments, but comprises more than two transition structures, whereby each transition structure allows for a signal coupling of the feeding transmission line segment with an antenna element transmission line segment. Thus, a single feeding transmission line segment is connected to and feeds several and possibly a large number of antenna element transmission line segments. This significantly reduces the space that is required for connecting each of the unit cells with the respective antenna element to a common feeding point of the feeding network or to the control unit of the phased array antenna device.

The position of the transition structure at a phase shifting distance from the unit cell which is connected via the transition structure to the feeding transmission line segment allows for a less curved course of the corresponding antenna element transmission line segment. The phase shifting distance between the transition structure and the connection to the antenna element within the unit cell is preferably equal to or just a little bit larger than the minimum length of the antenna element transmission line segment that is required for the capability and performance as phase shifting device. Thus, it is not necessary for the antenna element transmission line segment to have a strongly curved or meandering course, which reduces unwanted emission of electromagnetic radiation.

According to a preferred embodiment, the phase shifting distance is between one and two extensions of the unit cell. For many applications with radio frequency signals a distance of more than two diameters or longest extensions of a unit cell is usually enough for the antenna element transmission line segment to act as phase shifting device. Current tunable dielectric materials like e.g. tunable liquid crystal materials provide for a range of permittivity values that allows for creating and controlling a phase shift of approximately 360 degrees or more for a radio frequency signal that travels along the antenna element transmission line segment. The shorter the antenna element transmission line segments are, the less space is required for the courses of the antenna element transmission lines at a distance to other electrodes or electroconductive components that are arranged within the same plane or the same substrate layer surfaces of the antenna element transmission lines. The less curves and corners within the course of the antenna element transmission line segment, the less electromagnetic radiation is emitted that might reduce the signal quality or interfere with other transmission lines or signal processing components within the phased array antenna device.

According to a favorable aspect subsequent transition structures are designed in such a way that the antenna element transmission line segments of consecutive transition structures are arranged at opposite sides of the feeding transmission line segment. Thus, the antenna element transmission line that originates from a first transition structure along the feeding transmission line segment can run mostly parallel to the feeding transmission line segment and pass by a second transition structure without the need of a lateral offset to allow for another antenna element transmission line segment that originates from the second transition structure and also runs along the same side of the feeding transmission line segment. Alternating the arrangement of the consecutive antenna element transmission lines on both sides of the feeding transmission line segment helps to reduce curves along the course of the antenna element transmission line segments. Furthermore, the alternating origin and destination of the antenna element transmission line segments with respect to the course of a feeding transmission line segments allows for a more compact and space saving arrangement of the antenna elements and the corresponding unit cells.

According to a very advantageous aspect, all antenna element transmission line segments that originate on a first side of the feeding transmission line segment run in a first direction parallel to the direction of the feeding transmission line segment, whereas all antenna element transmission line segments that originate on a second side of the feeding transmission line segment opposite to the first side run in a second direction that is opposite to the first direction. It is considered an additional and important advantage of such a topology that by alternating the origin as well as the direction of the consecutively originating antenna element transmission line segments, it is easily possible that adjacent antenna elements are alternatingly connected via an antenna element transmission line segment that runs in a first direction and couples from a first side into the feeding transmission line segment and via an antenna element transmission line segment that runs in a second direction and couples from a second side into the feeding transmission line segment. Thus, without additional limitations or requirements for the antenna element transmission line segments, adjacent antenna elements are connected from opposing sides of the antenna elements with the respective antenna element transmission line segment, which can be used for an alternating polarization of the adjacent antenna elements. The alternating polarization of antenna elements results in 180° shift of polarization of radiation that is emitted or received by adjacent antenna elements, which provides for a significant reduction of unwanted polarization resulting in an improved signal quality. In short, such a topology allows for a simple implementation of a sequential rotation for the phased array antenna design.

In yet another favorable aspect, all antenna element transmission line segments have the same length. If the antenna element transmission line segments are used as part of the phase shifting devices, having the same length allows for the implementation of a single and identical design for all phase shifting devices, which facilitates the manufacture and operation of the phase shifting devices, as e.g. application of an identical bias voltage to several phase shifting devices results in an identical phase shift that is created by said several phase shifting devices.

In order to further reduce unwanted electromagnetic radiation along the antenna element transmission line segments, all sections of the antenna element transmission lines run parallel to the feeding transmission line segment or at an angle less than 50° with respect to the feeding transmission line segment to which the respective antenna element transmission line is coupled via the transition structure. According to this aspect, the antenna element transmission line segments do not comprise any corners or curves with a change of direction of more than 50° and preferably only comprise curves along the course with a change of direction of 45° or less.

According to another advantageous aspect, the unit cells are arranged in a matrix shaped arrangement, and each of the feeding transmission line segments runs along a straight line that traverses or passes by a plurality of unit cells that are arranged along a straight line within the matrix shaped arrangement. Feeding transmission line segments that do not comprise any curves also reduce any unwanted electromagnetic radiation originating from radio frequency signals that are transmitted along the feeding transmission line segments. Furthermore, the manufacture of feeding transmission line segments that run along straight lines is less prone to defects or unavoidable inaccuracies during manufacture that degrade signal quality and performance of the phased array antenna device.

According to a favorable embodiment, each of the feeding transmission line segments runs along or through more than two unit cells and comprises one transition structure for each of the more than two unit cells. Thus, the distance between the feeding transmission line segment that provides for a signal transmitting connection with the control unit and each of the respective antenna elements is relatively short, which also reduces the space requirements for the antenna element transmission line segments that each connect the feeding transmission line segment with the corresponding antenna element.

According to a further aspect, each of the feeding transmission line segments runs along a straight line. Usually, the antenna elements and therefore also the unit cells are spatially positioned in a matrix shaped arrangement. For such a matrix shaped arrangement the course of the feeding transmission line segment can be a straight line that runs either between two adjacent rows of unit cells or that traverses many unit cells along a straight line of unit cells within the matrix shaped arrangement of unit cells. Feeding transmission line segments that run along a straight line also reduce the unwanted emission of electromagnetic radiation that is caused by bends or corners within the course of a transmission line.

According to an advantageous embodiment, the feeding transmission line segments are implemented as microstrip transmission lines with a line shaped microstrip electrode arranged at a distance to a ground electrode. A microstrip line and transition structures for signal coupling into antenna element transmission line segments are easy to manufacture. Furthermore, a ground electrode that is required for a microstrip transmission line can be useful in order to provide for a back shield that prevents electromagnetic radiation emissions away from the intended direction and towards a back side of the unit cell arrangement.

In yet another and also favorable embodiment, the feeding transmission line segments are implemented as differential pair transmission lines with two similar differential pair electrodes running along the feeding transmission line segment. Differential pair transmission lines do not require a ground electrode, which allows for more options for the design of the phased array antenna device. Furthermore, the signal transmission along a differential pair transmission line is less affected by interfering electromagnetic radiation emissions that occur within the phased array antenna device and that cannot be fully avoided. In addition, it is considered advantageous for the antenna element transmission line segments to be designed as differential pair transmission lines as well. Then, the transition structure that is required for signal coupling between the feeding transmission line segment and the antenna element transmission line segments does not require a change of type of transmission line from microstrip transmission line to differential pair transmission line.

It is considered a very advantageous aspect that each of the antenna element transmission line segments can be implemented as differential pair transmission line with two similar differential pair electrodes running along the antenna element transmission line segment, whereby at least one of the two differential pair electrodes of the antenna element transmission line segment is electrically isolated from the corresponding feeding transmission line segment. As at least one of the two differential pair electrodes of the antenna element transmission line segment is not galvanically connected to the feeding transmission line segment, it is possible to apply an electric potential difference to the two differential pair electrodes of the antenna element transmission line that is independent from any electric potential or electric potential difference of the feeding transmission line segment. Thus, it is possible to make use of phase shifting devices with a tunable dielectric material arranged in between or next to the two differential pair electrodes of the antenna element transmission line and to apply individual bias voltages to each of the phase shifting devices. This allows for a very simple design and operation of the antenna element and of the phase shifting device within each of the unit cells.

According to an aspect, the transition structure comprises two line shaped transition electrodes, whereby the transition structure also comprises an overlapping section with a part of least one of the two line shaped transition electrodes running parallel but at a distance to the feeding transmission line segment for signal coupling from the feeding transmission line segment into the antenna element transmission line segment, whereby each of the two line shaped transition electrodes runs into a corresponding one of the two differential pair electrodes of the antenna element transmission line segment. Thus, the two line shaped transition electrodes can be designed and manufactured to be the respective end sections of the corresponding differential pair electrodes of the antenna element transmission line segment that is designed as differential pair transmission line. The length of the overlapping section and in particular the line shaped transition electrode that runs parallel but at a distance to the feeding transmission line segment can be adapted to belong enough to provide for a strong and effective coupling, but to be as short as possible in order to reduce the space that is required for the transition structure. As at least one of the two line shaped transition electrodes is not galvanically connected to the feeding transmission line segment. There is no need for e.g. vias or interconnecting electrode structures that provide for a galvanic connection between different surfaces of substrate layers, which allows for simple and cost saving manufacture as well as a space saving design of the transition structure.

In order to provide for a very cost and space saving design of the transition structure, one of the two line shaped transition electrodes is designed as a balun-type line shaped transition electrode that provides for a phase difference of 180° with respect to the other line shaped transition electrode. A balun-type line shaped transition electrode comprises a U-shaped delay section within provides a simple means to provide for a 180° phase difference for the signal transmission along the antenna element transmission line segment.

A feeding transmission line segment with several and possibly a large number of transition structures that allow for a signal coupling between the feeding transmission line segment and a correspondingly large number of antenna element transmission line segments enables a topology of the phased array antenna device with a very small foot print that is required for the unit cells comprising the respective antenna element, but provides for a very high performance and effectivity as well as a favorable signal to noise ratio of the phased array antenna device when compared to conventional phased array antenna devices that are already known in prior art. In addition, by avoiding a strongly curved or meandering course of the antenna element transmission line segments, the unwanted electromagnetic radiation during signal transmission along these antenna element transmission line segments can be significantly reduced without imposing severe limitations for the topology and design of the phased array antenna device.

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

DETAILED DESCRIPTION

Figure 1:
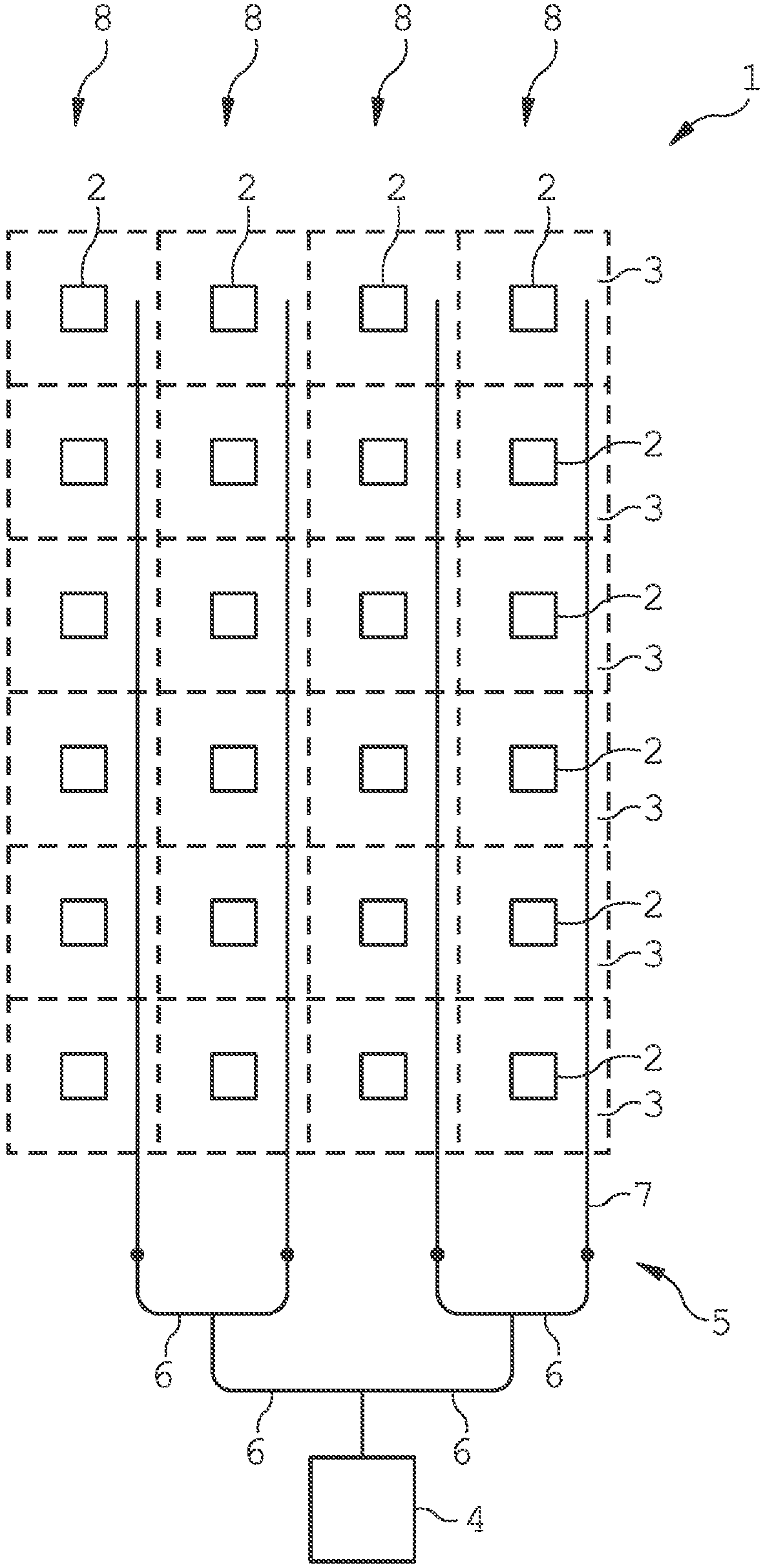
FIG. 1 illustrates a schematic representation of a phased array antenna device with a plurality of unit cells arranged within a matrix shaped pattern and each comprising an antenna element, whereby each antenna element is connected to a control unit via a feeding network for transmitting radio frequency signals between the control unit and the antenna elements.

FIG. 1 shows a schematic illustration of a phased array antenna device 1 comprising a plurality of antenna elements 2, whereby the antenna elements 2 are arranged on a plane in a matrix shaped topology. All antenna elements 2 are schematically illustrated as squares. The antenna elements 2 can be of any design or type of radiation element that emits or receives radio frequency signals of electromagnetic radiation. The plane can be divided into a corresponding plurality of unit cells 3 each comprising one antenna element 2 and a region around this antenna element 2. Adjacent unit cells 3 do not overlap, but are immediately adjacent to each other and form a matrix shaped arrangement that is adapted to the position of the antenna elements 2. The extension of a unit cell 3 in a given direction equals the distance between adjacent antenna elements 2 in this direction. The shape of a unit cell 3 can be rectangular as shown in FIG. 1. A unit cell 3 may also be of any other shape, e.g. honeycombed or circular. A unit cell 3 usually has no structural limitation.

The phased array antenna device 1 also comprises a control unit 4 for controlling radio frequency signals that are received or emitted by the antenna elements 2. Signal transmission between the control unit 4 and each of the antenna elements 2 is provided by a feeding network 5. The feeding network 5 comprises a corporate feed network. Corporate feed transmission line segments 6 of the corporate feed network originate from the control unit 4 and, after several branchings, run into feeding transmission line segments 7. Each of the feeding transmission line segments 7 runs along a straight line along a row 8 of unit cells 3 within the matrix shaped arrangement of unit cells 3. Each feeding transmission line segment 7 traverses through several unit cells 3 and comprises a corresponding number of transition structures 9. Each antenna element 2 is connected to a corresponding transition structure 9 via an antenna element transmission line segment 10 that are not shown in FIG. 1, but in FIGS. 2 to 4. Thus, a radio frequency signal that originates from the control unit 4 is transmitted along corporate feed transmission line segments 6 and along a feeding transmission line segment 7 and via a transition structure 9 along a successive antenna element transmission line segment 10 to the corresponding antenna element 2. In case of a reception of a radio frequency signal with an antenna element 2, the radio frequency signal travels along the antenna element transmission line segment 10 and through the transition structure 9 into the corresponding feeding transmission line segment 7 and via the corporate feed transmission line segments 6 towards the control unit 4.

The antenna element transmission line segments 10 is also designed for affecting the phase of the radio frequency signal and therefore used as a phase shifting device 11. However, the minimum length of the antenna element transmission line segment 10 that is required for performing a phase shift that is sufficient for a useful superimposition of the radio frequency signals of all antenna elements 2 exceeds the extension of a unit cell 3. Conventional phased array antenna devices 1 comprise antenna element transmission line segments 10 with a spiral or meandering course that is arranged within the corresponding unit cell 3. However, each curve or corner along the course of the antenna element transmission line segment 10 causes unwanted electromagnetic radiation emission that affects the signal quality and that interferes with signal transmission along other antenna element transmission line segments or feeding transmission line segments 7.

Figure 2:
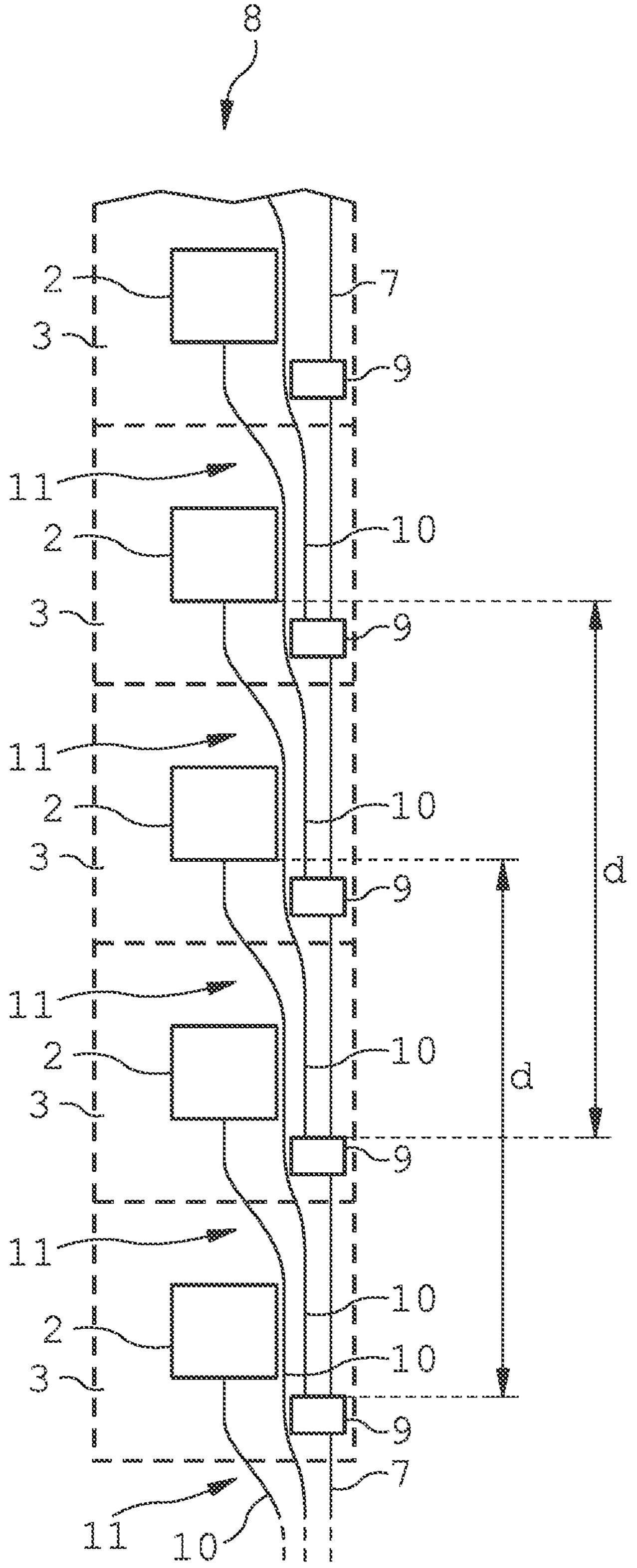
FIG. 2 illustrates a schematic top view of a row of unit cells, whereby a feeding transmission line segment that runs along this row of unit cells comprises a transition structure for each unit cell and with an antenna element transmission line segment for signal transmission between a transition structure and a corresponding antenna element.
Figure 3:
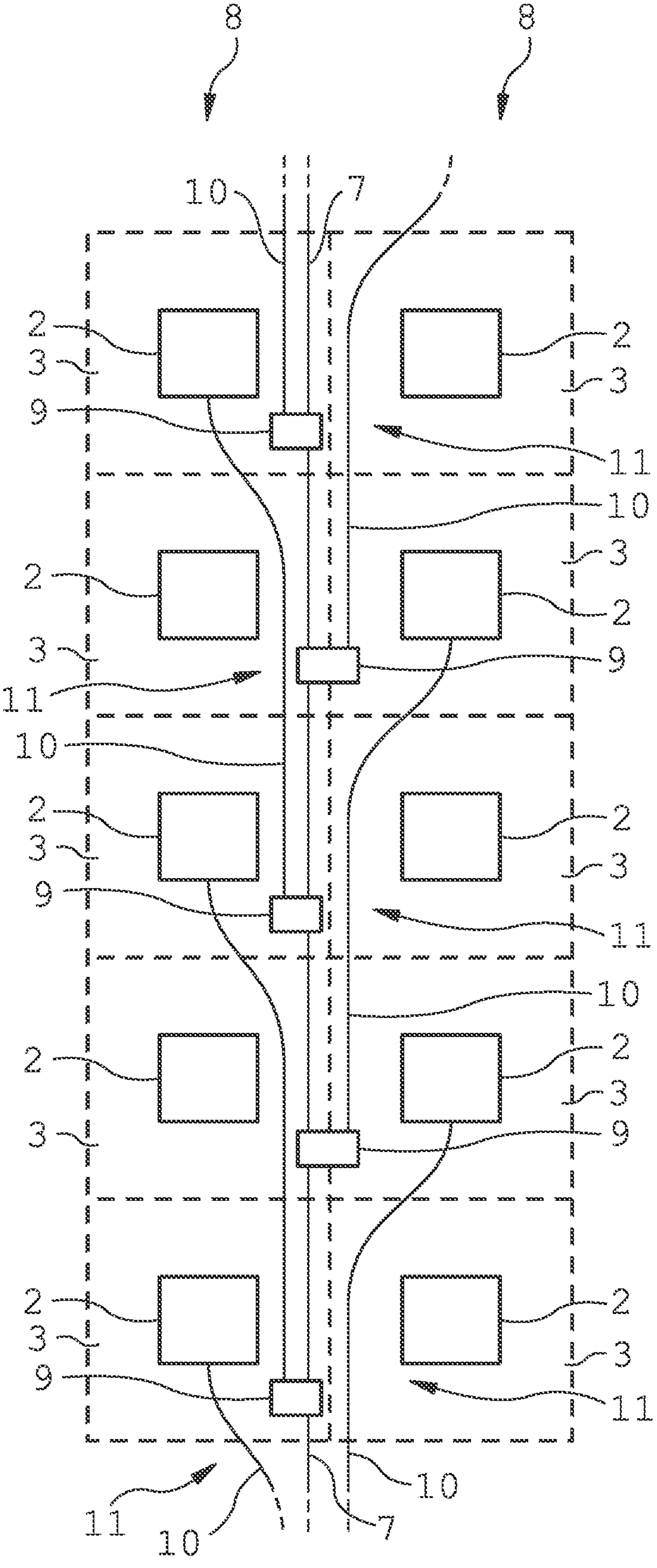
FIG. 3 illustrates a schematic top view of two rows of unit cells, whereby a feeding transmission line segment that runs along these rows of unit cells comprises transition structures with antenna element transmission line segments that are arranged on opposite sides of the feeding transmission line segment.
Figure 4:
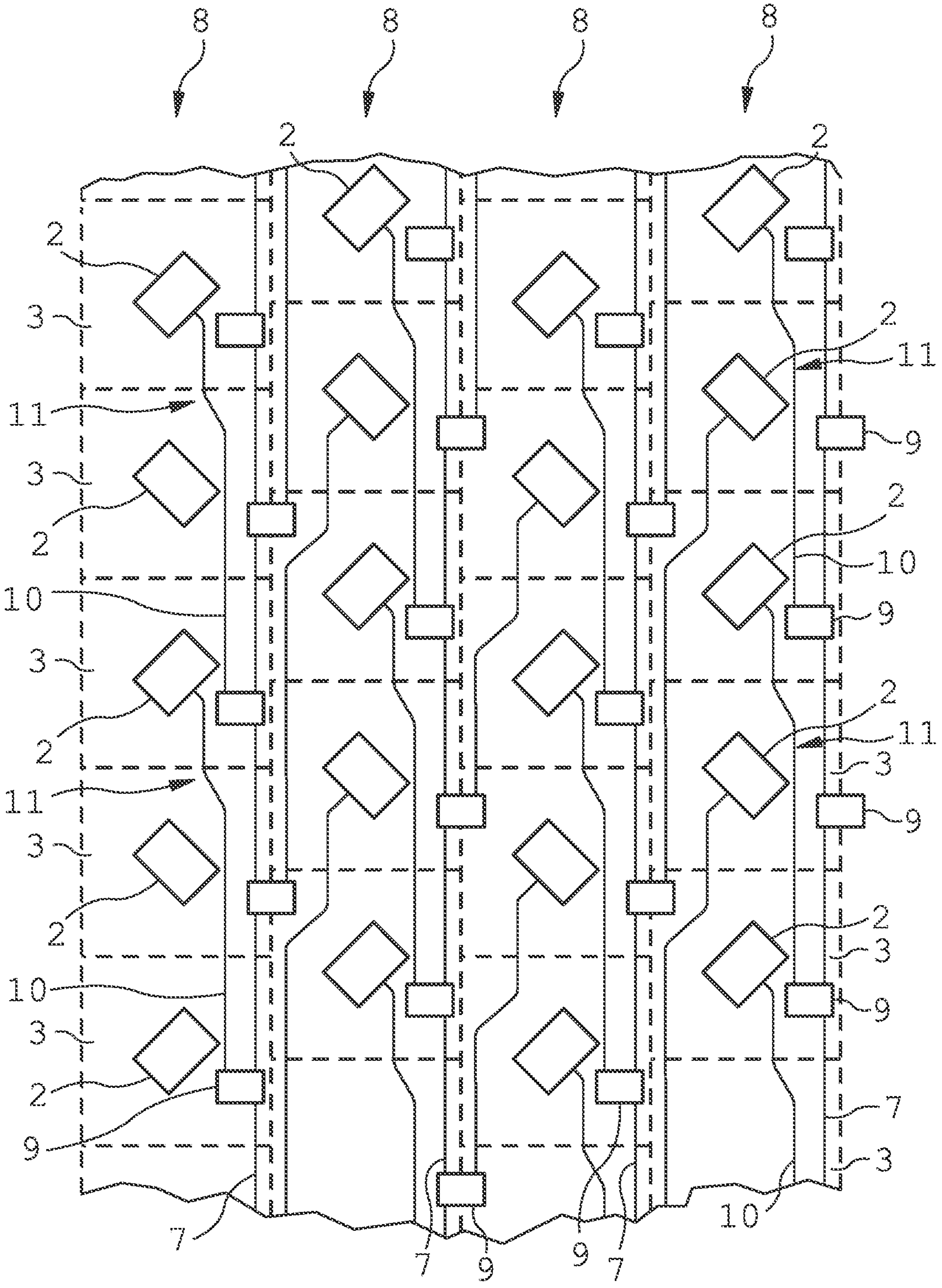
FIG. 4 illustrates a schematic top view of a matrix shaped arrangement of unit cells with several feeding transmission line segments each running along one row of unit cells.

In order to avoid curves and corners along the course of the antenna element transmission line segment 10, the antenna element transmission line segment 10 connects the antenna element 2 of a given unit cell 3 with a transition structure 9 that is located in another unit cell 3 at a phase shifting distance d that exceeds the extension of the unit cells 3 in any direction. Preferably, the phase shifting distance d is large enough to allow for an essentially straight-line course of the antenna element transmission line segment 10 as schematically illustrated in FIGS. 2 to 4. The course of the antenna element transmission line segment 10 is significantly different from a spiral or meandering course and mainly a straight-line course with only a small lateral offset that is necessary to bridge the lateral distance of the antenna element 2 from the transition structure 9 at the feeding transmission line segment 7. The design and course of the antenna element transmission line segments 10 can be adapted to cause the least possible electromagnetic radiation emission during signal transmission of a radio frequency signal along the antenna element transmission line segments 10.

Furthermore, due to the straight-line course of the feeding transmission line segments 7 the space requirements for transmission lines that connect each antenna element 2 with the control unit 4 are significantly smaller than the space requirements for a conventional corporate feed network. In addition, the straight-line course of the feeding transmission line segments 7 also reduces unwanted emission of electromagnetic radiation during signal transmission along the feeding transmission line segments 7.

The design that is schematically illustrated in FIG. 2 comprises a feeding transmission line segment 7 that runs along one row 8 of unit cells 3. The feeding transmission line segment 7 comprises transition structures 9 and antenna element transmission line segments 10 that each originate at the same side of the feeding transmission line segment 7 and that each run to an antenna element 2 within the next but one unit cell 3 within the same row 8 of unit cells 3.

The design that is schematically illustrated in FIG. 3 comprises a feeding transmission line segment 7 with is connected to antenna elements 2 on opposite sides of the feeding transmission line segment 7. For each consecutive transition structure 9 arranged along the course of the feeding transmission line segment 7 the corresponding antenna element transmission line segment 10 originates at an opposite side of the feeding transmission line segment 7 and runs essentially parallel to the feeding transmission line segment 7 until the next but one unit cell 3 and the antenna element 2 that is located within this unit cell 3. Due to the alternating position and course of the antenna element transmission line segments 10, the course of the respective antenna element transmission line segments 10 can be even less curved than the corresponding course of the antenna element transmission line segments 10 shown in FIG. 2.

FIG. 4 schematically illustrates an exemplary design of a matrix shaped arrangement of unit cells 3 with several rows 8, whereby adjacent rows 8 have an offset in the direction of the respective rows 8 with respect to each other. Each feeding transmission line segment 7 is connected to several antenna element transmission line segments 10 that are arranged alternately at opposite sides of the feeding transmission line segment 7.

Preferably, the antenna element transmission line segments 10 are designed and manufactured as differential pair transmission lines with two differential pair electrodes that run essentially parallel and with a distance towards each other. The feeding transmission line segments 7 can be designed and manufactured as microstrip transmission lines with a line shaped microstrip electrode that runs at a distance to a plane-shaped ground electrode. However, it is also possible to have feeding transmission line segments 7 designed and manufactured as differential pair transmission lines or to have antenna element transmission line segments 10 designed and manufactured as microstrip transmission lines.

Figure 5:
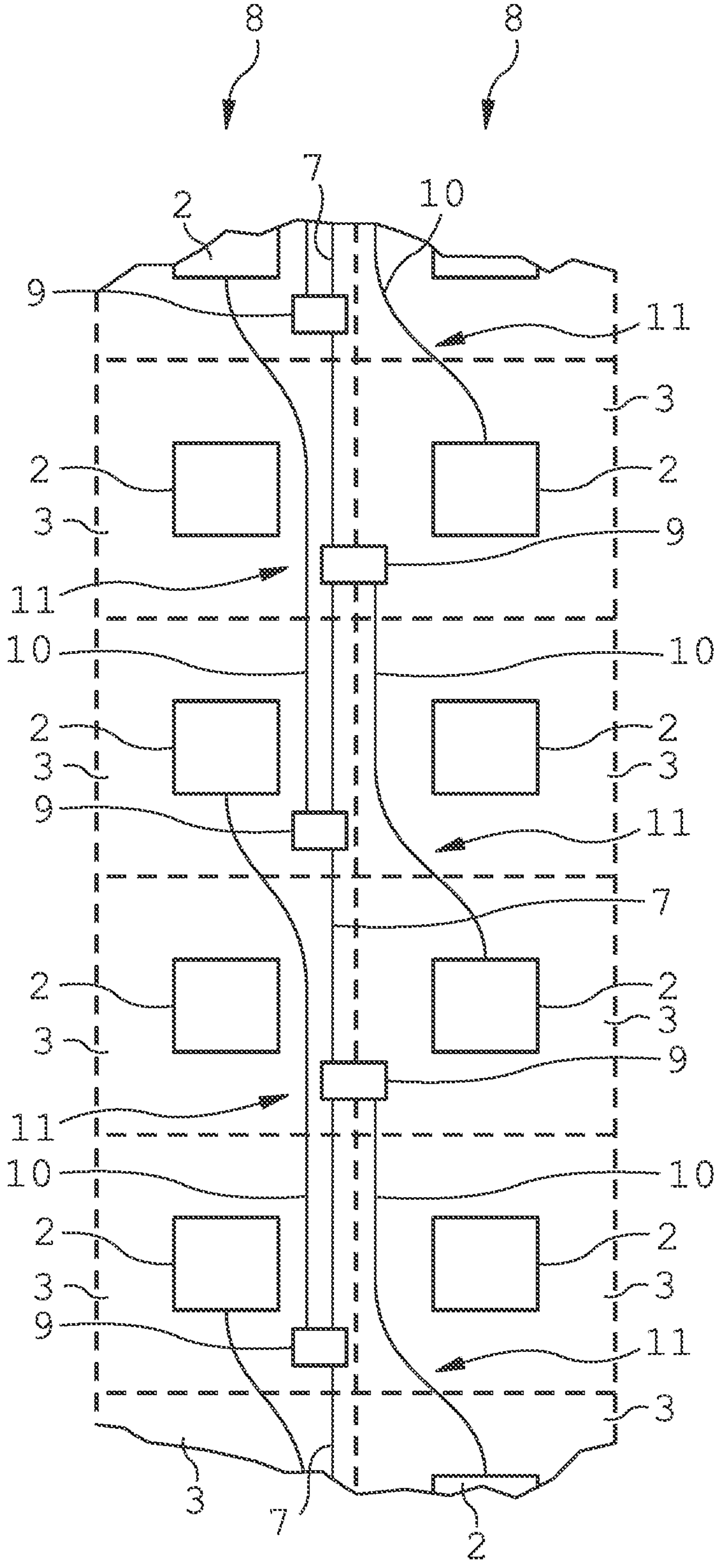
FIG. 5 illustrates a schematic top view of two rows of unit cells similar to FIG. 3, but with a different arrangement and design of the antenna element transmission line segments.

FIG. 5 schematically illustrates an exemplary design of a feeding transmission line segment 7 that is connected to antenna elements 2 on opposite sides of the feeding transmission line segment 7. This aspect of the topology is similar to the embodiment shown in FIG. 3. However, the direction of the antenna element transmission line segments 10 that originate at a first side of the feeding transmission line segment 7 differs from the direction of the antenna element transmission line segments 10 that originate at a second side of the feeding transmission line segment 7 that is opposite to the first side. Thus, e.g. the direction of the antenna element transmission line segments 10 that originate on the left side of the feeding transmission line segment 7 as shown in FIG. 5 is upwards, whereas the direction of the antenna element transmission line segments 10 that originate on the right side of the feeding transmission line segment 7 as shown in FIG. 5 is downwards.

Figure 6:
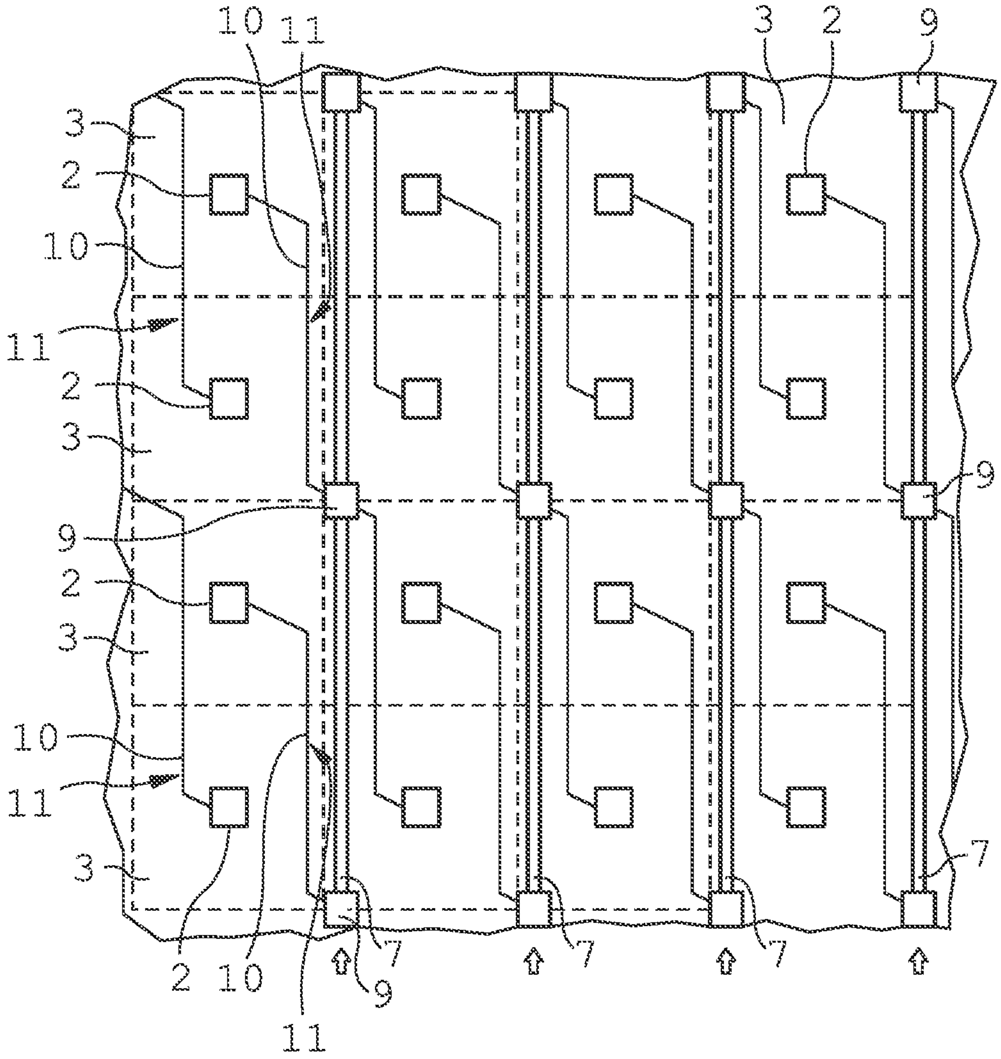
FIG. 6 illustrates a schematic top view of a matrix shaped arrangement of unit cells.

FIG. 6 schematically illustrates another exemplary embodiment of a matrix shaped arrangement and connection of antenna elements 2 in corresponding unit cells 3. Adjacent rows of the matrix shaped arrangement of antenna elements 2 have no offset with respect to each other. Thus, the antenna elements 2 are located along straight lines in rows 8 and columns.

Similar to the embodiment that is illustrated in FIG. 5, the direction of the antenna element transmission line segments 10 that originate at a first side of the feeding transmission line segment 7 is opposite to the direction of the antenna element transmission line segments 10 that originate at a second side of the feeding transmission line segment 7 that is opposite to the first side. Different to the embodiment of FIG. 5, all antenna element transmission line segments 10 have equal length. Such a topology is considered very advantageous, as this topology allows for operating the antenna elements 2 with sequential rotation, i.e. with opposite polarization of radiation of adjacent antenna elements 2. Furthermore, due to the identical length of the antenna element transmission line segments 10 the design and control of the phase shifting devices 11 along the antenna element transmission line segments 10 can be identical as well.

Figure 7:
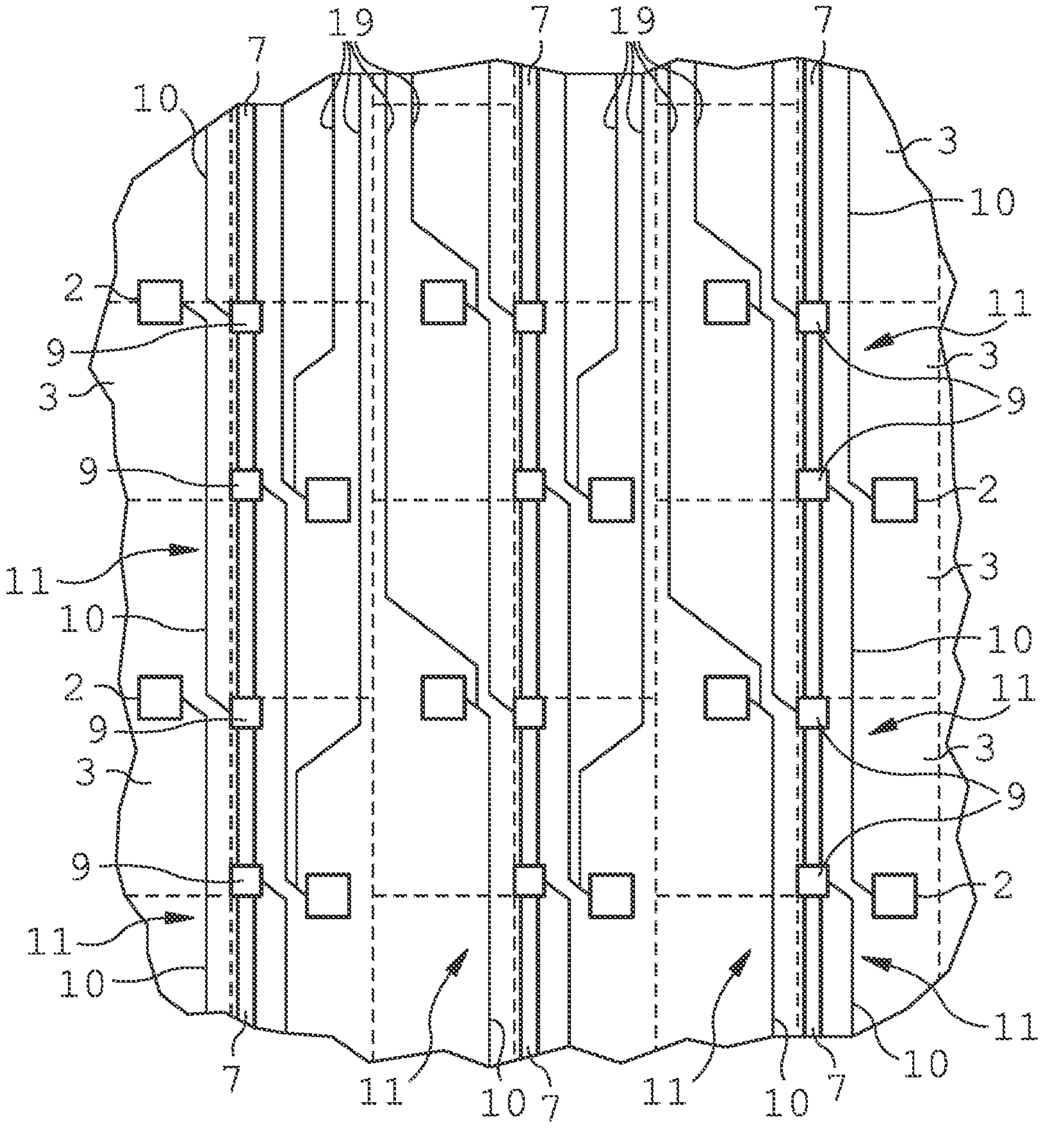
FIG. 7 illustrates a schematic top view of another embodiment of a matrix shaped arrangement of unit cells.

In FIG. 7 another embodiment with a matrix shaped arrangement of antenna elements 2 is shown. Adjacent rows for antenna elements 2 and corresponding unit cells 3 have an offset with respect to each other. The arrangement of antenna element transmission line segments 10 on opposite sides of the feeding transmission line segments 7 and the opposite directions of consecutive antenna element transmission line segments 10 are similar to the embodiment shown in FIG. 6. In addition, FIG. 7 shows bias voltage lines 19 that run towards each of the antenna element transmission line segments 10. Each bias voltage line 19 allows for the application of an individual bias voltage to an electrode of the corresponding antenna element transmission line segment 10, thereby controlling the phase shift that is applied by the corresponding phase shifting device 11 to a radio frequency signal that is transmitted along the antenna element transmission line segment 10.

Figure 8:
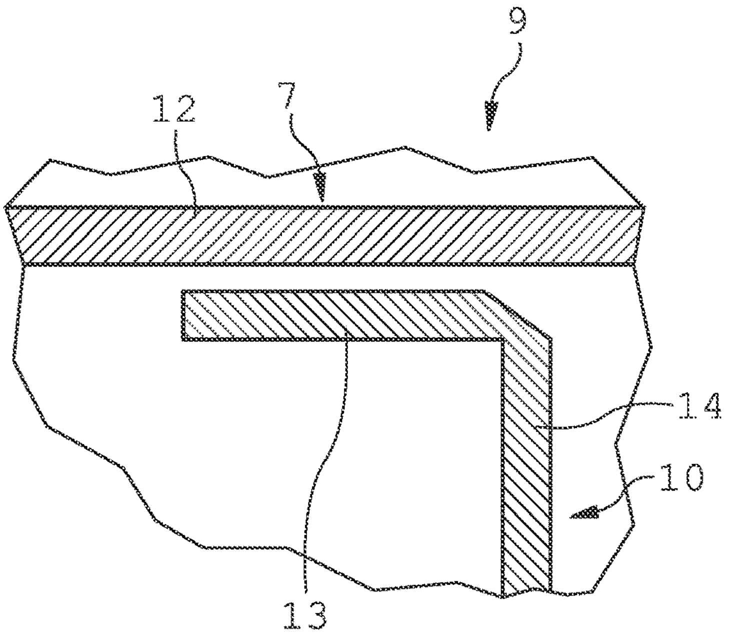
FIG. 8 illustrates a schematic top view of a transition structure that provides for a signal coupling between a microstrip transmission line and a microstrip transmission line.

FIG. 8 schematically illustrates an exemplary embodiment of a transition structure 9 that can be used to couple a radio frequency signal between two microstrip transmission lines. A line shaped microstrip electrode 12 of the feeding transmission line segment 7 runs along a straight line. An end section 13 of a line shaped microstrip electrode 14 of the antenna element transmission line segment 10 forms a line shaped transition electrode and runs parallel but at a distance to a line shaped microstrip electrode 14 of the feeding transmission line segment 7, whereby the length of the parallel end section 13 of the line shaped microstrip electrode 14 is adapted and preset to provide for a strong signal coupling of a radio frequency signal between the line shaped microstrip electrode 12 of the feeding transmission line segment 7 and the line shaped microstrip electrode 14 of the antenna element transmission line segment 10.

Figure 9:
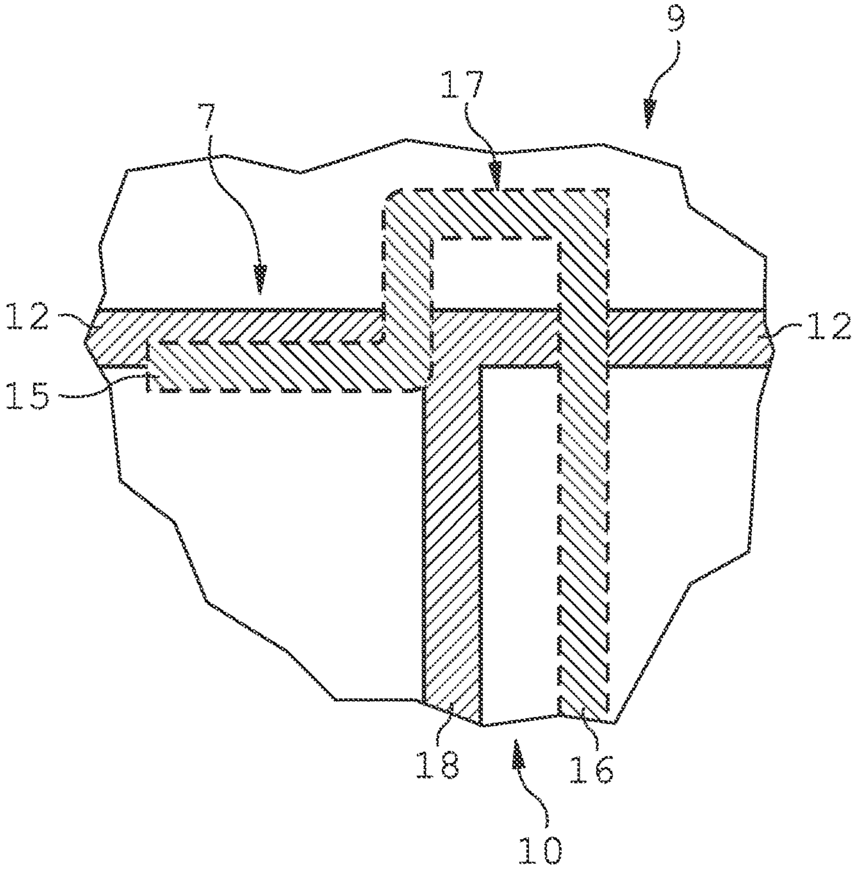
FIG. 9 illustrates a schematic top view of a transition structure that provides for a signal coupling between a microstrip transmission line and a differential pair transmission line.

FIG. 9 schematically illustrates another exemplary embodiment of a transition structure 9 that allows for the coupling of a radio frequency signal between a microstrip transmission line and a differential pair transmission line. An end section 15 of the first line shaped differential pair electrode 16 forms a line shaped transition electrode and runs parallel but at a distance and preferably at another substrate to the line shaped microstrip electrode 12 of the feeding transmission line segment 7. For clarification purposes the first line shaped differential pair electrode 16 is illustrated with dashed lines. After the end section 15, the first line shaped differential pair electrode 16 runs along a U-shaped delay course 17 that results in a 180° phase shift with respect to the signal that is coupled into the second line shaped differential pair electrode 18. The U-shaped delay course 17 can also be regarded as being part of the line shaped transition electrode of the transition structure 9. The second line shaped differential pair electrode 18 can be connected or coupled with or without a galvanic connection to the line shaped microstrip electrode 12 of the feeding transmission line segment 7. FIG. 8 illustrates a galvanic connection designed as a branch of the line shaped microstrip electrode 12 of the feeding transmission line segment 7 into a branching line shaped differential pair electrode 18 of the antenna element transmission line segment 10.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

The invention claimed is:

1. A phased array antenna device (1), comprising:

a plurality of antenna elements (2) arranged in a spatial distribution that allows for the phased array antenna device (1) to emit and receive superposing radio frequency signals to and from different directions, wherein each antenna element (2) is positioned within a corresponding unit cell (3) of the phase array antenna device (1) and wherein the unit cells (3) are arranged in a non-overlapping manner next to each other;

a feeding network (5) for transmitting antenna signals between a common control unit (4) and the respective antenna element (2), wherein the feeding network (5) comprises a plurality of antenna element transmission line segments (10), each running into an antenna element (2);

a plurality of phase shifting devices (11), wherein for each antenna element (2) a corresponding phase shifting device (11) is arranged along the respective antenna element signal transmission line (10) that runs into said antenna element (2); and a plurality of feeding transmission line segments (7), wherein each feeding transmission line segment (7) comprises more than two transition structures (9) distributed along the feeding transmission line segment (7), wherein each transition structure (9) provides for a signal coupling into a corresponding antenna element transmission line segment (10), thereby connecting several dedicated antenna element transmission line segments (10) with the same feeding transmission line segment (7), and wherein the transition structure (9) for an antenna element transmission line segment (10) that runs into a unit cell (3) is positioned in the direction of the feeding transmission line segment (7) passing by or traversing this unit cell (3) at a phase shifting distance that is larger than an extension of the unit cell (3) measured in this direction.

2. The phased array antenna device (1) according to claim 1, wherein the phase shifting distance is between one and two extensions of the unit cell (3).

3. The phased array antenna device (1) according to claim 1, wherein subsequent transition structures (9) are designed in such a way that the antenna element transmission line segments (10) of consecutive transition structures (9) along a feeding transmission line segment (7) are arranged at opposite sides of the feeding transmission line segment (7).

4. The phased array antenna device (1) according to claim 3, wherein all antenna element transmission line segments (10) that originate on a first side of the feeding transmission line segment (7) run in a first direction parallel to the direction of the feeding transmission line segment (7), whereas all antenna element transmission line segments (10) that originate on a second side of the feeding transmission line segment (7) opposite to the first side run in a second direction that is opposite to the first direction.

5. The phased array antenna device (1) according to claim 1, wherein all antenna element transmission line segments have the same length.

6. The phased array antenna device (1) according to claim 1, wherein all sections of the antenna element transmission line segments (10) run parallel to the feeding transmission line segment (7) or at an angle less than 50° with respect to the feeding transmission line segment (7) to which the respective antenna element transmission line segment (10) is coupled via the transition structure (9).

7. The phased array antenna device (1) according to claim 1, wherein the unit cells (3) are arranged in a matrix shaped arrangement, and wherein each of the feeding transmission line segments (7) runs along a straight line that traverses or passes by a plurality of unit cells (3) that are arranged along a straight line.

8. The phased array antenna device (1) according to claim 1, wherein the feeding transmission line segments (7) are implemented as microstrip transmission lines with a line shaped microstrip electrode (12) arranged at a distance to a plane shaped ground electrode.

9. The phased array antenna device (1) according to claim 1, wherein the feeding transmission line segments (7) are implemented as differential pair transmission lines with two similar line shaped differential pair electrodes running along the feeding transmission line segment (7).

10. The phased array antenna device (1) according to claim 1, wherein each of the antenna element transmission line segments (10) is implemented as differential pair transmission line with two similar differential pair electrodes (16, 18) running along the antenna element transmission line segment (10), and wherein at least one of the two differential pair electrodes (16) of the antenna element transmission line segment (10) is electrically isolated from the corresponding feeding transmission line segment (7).

11. The phased array antenna device (1) according to claim 10, wherein the transition structure (9) comprises two line shaped transition electrodes (12, 15), wherein the transition structure (9) also comprises an overlapping section with a part of least one of the two line shaped transition electrodes (15) running parallel but at a distance to the feeding transmission line segment (7) for signal coupling from the feeding transmission line segment (7) into the antenna element transmission line segment (10), and wherein each of the two line shaped transition electrodes (12, 15) runs into a corresponding one of the two differential pair electrodes (18, 16) of the antenna element transmission line segment (10).

* * * * *